(12) United States Patent
Verma

(10) Patent No.: US 11,394,729 B2
(45) Date of Patent: Jul. 19, 2022

(54) METHOD AND SYSTEM FOR MANAGING IOT-BASED DEVICES IN AN INTERNET-OF-THINGS ENVIRONMENT

(71) Applicant: SIEMENS AKTIENGESELLSCHAFT, Munich (DE)

(72) Inventor: Amit Verma, Taufkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 30 days.

(21) Appl. No.: 16/965,007

(22) PCT Filed: Jan. 25, 2019

(86) PCT No.: PCT/EP2019/051847
§ 371 (c)(1),
(2) Date: Jul. 26, 2020

(87) PCT Pub. No.: WO2019/145474
PCT Pub. Date: Aug. 1, 2019

(65) Prior Publication Data
US 2021/0136088 A1    May 6, 2021

(30) Foreign Application Priority Data
Jan. 26, 2018 (EP) .................................... 18153611

(51) Int. Cl.
*H04L 9/40* (2022.01)
*G16Y 30/10* (2020.01)
(52) U.S. Cl.
CPC .......... *H04L 63/1416* (2013.01); *G16Y 30/10* (2020.01); *H04L 63/0823* (2013.01); *H04L 63/0876* (2013.01); *H04L 63/1433* (2013.01)

(58) Field of Classification Search
CPC ............. H04L 63/1416; H04L 63/0823; H04L 63/0876; H04L 63/1433; H04L 63/20; H04L 63/101; G16Y 30/10
See application file for complete search history.

(56) References Cited

U.S. PATENT DOCUMENTS 10,498,750 B2 * 12/2019 Bansal .................... H04L 63/20
10,554,412 B2 *  2/2020 Subramanian ........ H04L 9/0637
(Continued)

OTHER PUBLICATIONS

Notice of Submission the International Provisional Patentability Report for International Patent Application PCT/EP2019/051847 dated Dec. 20, 2019.

*Primary Examiner* — Sarah Su
(74) *Attorney, Agent, or Firm* — Lempia Summerfield Katz LLC

(57) ABSTRACT

A method and system for managing IoT-based devices in an Internet-of-Things (IoT) environment is disclosed. The method includes determining violation of at least one pre-defined security requirement by at least one IoT-based device. Then, the method includes generating a unique signature of the IoT-based device based on information associated with the IoT-based device. The method includes terminating communication between the IoT-based device and an IoT-cloud platform. Also, the method includes sending a first notification indicating that the IoT-based device violates the at least one pre-defined security requirement to the IoT-based devices connected to the IoT-cloud platform. The first notification includes the unique signature of the IoT-based device.

10 Claims, 7 Drawing Sheets

(56) References Cited

U.S. PATENT DOCUMENTS

| | | |
|---|---|---|
| 2014/0337862 A1 | 11/2014 | Valencia |
| 2016/0219060 A1 | 7/2016 | Karunakaran |
| 2016/0261465 A1* | 9/2016 | Gupta .................... H04L 43/04 |
| 2017/0180380 A1* | 6/2017 | Bagasra .................. H04L 63/10 |
| 2017/0289176 A1* | 10/2017 | Chen .................. H04L 63/1416 |
| 2017/0345019 A1 | 11/2017 | Radocchia |
| 2017/0346836 A1* | 11/2017 | Holland ................ H04W 12/08 |
| 2018/0129805 A1* | 5/2018 | Samuel ................ H04W 68/12 |
| 2018/0234454 A1* | 8/2018 | Aggarwal ............. H04W 12/08 |
| 2018/0295148 A1* | 10/2018 | Mayorgo ................ H04W 4/70 |
| 2019/0230063 A1* | 7/2019 | McCready ............ H04W 12/03 |
| 2019/0349443 A1* | 11/2019 | Bender ................ G16Y 30/00 |
| 2021/0029156 A1* | 1/2021 | Sharifi Mehr ........ H04L 67/303 |
| 2021/0126974 A1* | 4/2021 | Chau .................... H04L 41/145 |
| 2022/0021654 A1* | 1/2022 | Trentini ............. H04L 63/0861 |

* cited by examiner

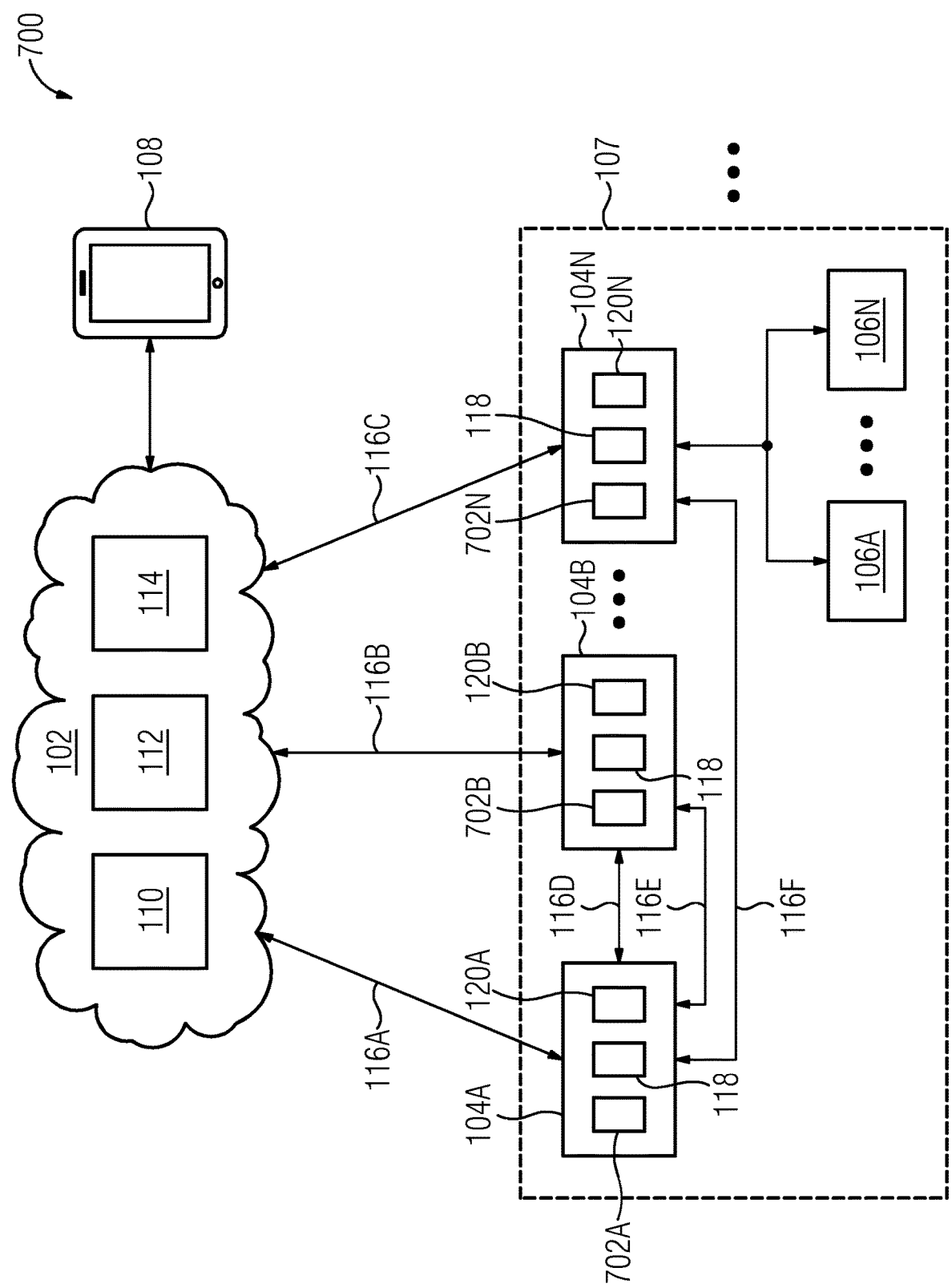

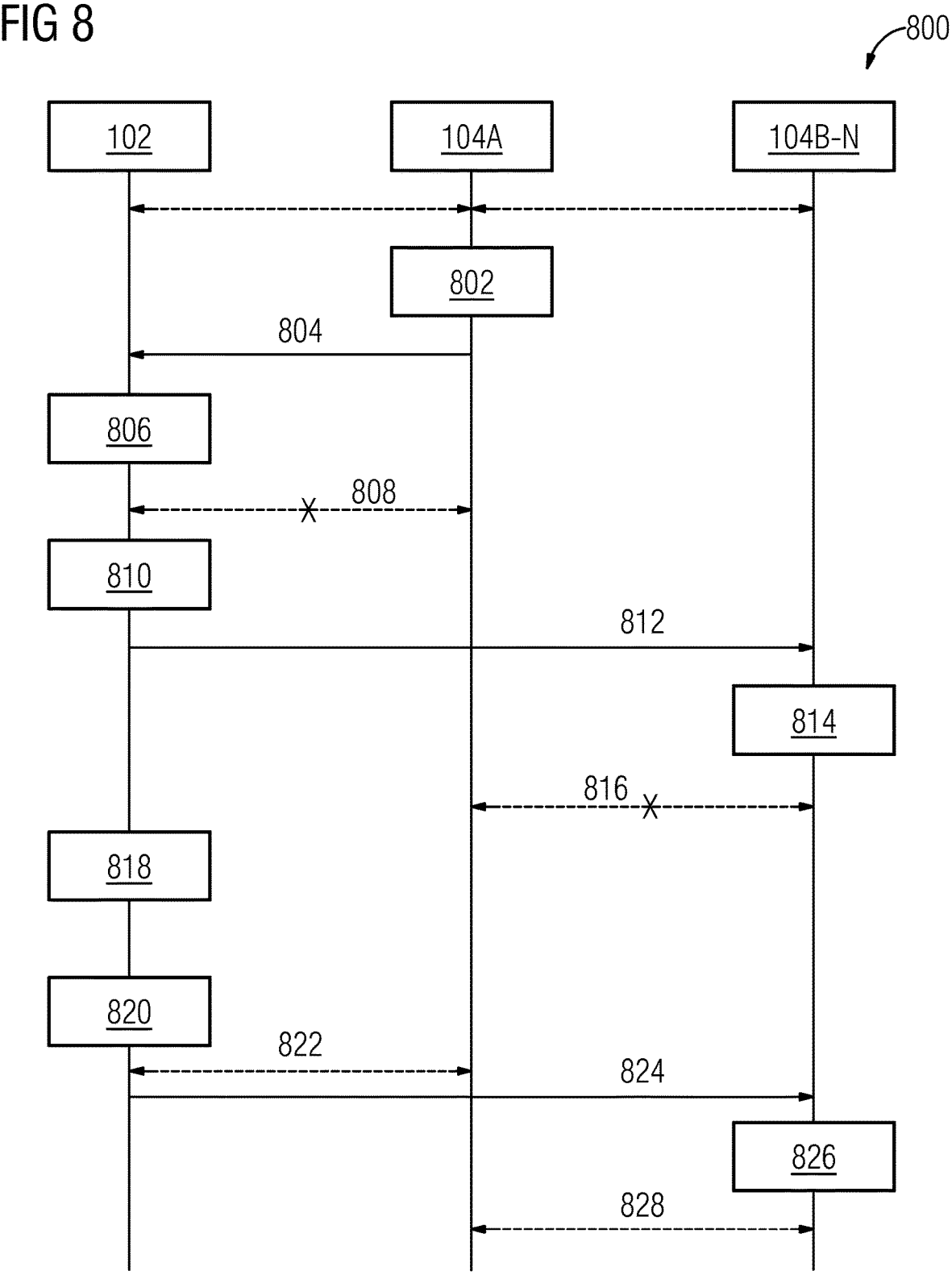

METHOD AND SYSTEM FOR MANAGING IOT-BASED DEVICES IN AN INTERNET-OF-THINGS ENVIRONMENT

This application is the National Stage of International Application No. PCT/EP2019/051847, filed Jan. 25, 2019, which claims the benefit of European Patent Application No. EP 18153611.1, filed Jan. 26, 2018. The entire contents of these documents are hereby incorporated herein by reference.

BACKGROUND

The present disclosure relates to the field of cyber-physical systems, and more particularly, relates to managing Internet-of-Things (IoT)-based devices in an IoT environment.

An IoT environment such as Industrial IoT environment includes a plurality of devices such as industrial automation devices (e.g., controller, human-machine interface device, servers, Input/Output modules), sensors, actuators, and/or other assets (e.g., robots, CNC machines, motors, valves, boilers, furnaces, turbines and associated components, etc.) in a plant (e.g., manufacturing facility, power plant, and so on) communicatively connected to a IoT-cloud platform. The IoT-cloud platform may be implemented in a cloud computing environment (e.g., distributed computing environment) for providing one or more services such as storing, analyzing, and visualizing data received from the devices. An exemplary distributed computing environment may include a set of servers hosting the services. The IoT-cloud platform may be an infrastructure that allows shared computing resources in the distributed computing environment and one or more services hosted on the shared computing resources to be accessed and utilized by the IoT-based devices. Also, the IoT-cloud platform may be provided as a platform-as-a-service (PaaS), where the services may reside and execute on the IoT-cloud platform as a cloud-based service.

One or more devices may be directly connected to the IoT-cloud platform via a network (e.g., Internet). Alternatively, remaining devices may be connected to the IoT-cloud platform via IoT gateway. The devices or the IoT gateway are commonly referred herein as IoT-based devices. The IoT-based devices may be connected with each other in the IoT environment.

The IoT-cloud platform may be connected to the IoT-based devices located in different geographical locations. Also, each of the IoT-based devices may possess different security capabilities. It is possible that one or more IoT-based devices do not meet desired security standards in the IoT environment, which may possess cyber security risk to the remaining IoT-based devices connected to the vulnerable IoT-based devices or the IoT-cloud platform connected to the vulnerable IoT-based devices.

SUMMARY AND DESCRIPTION

The scope of the present invention is defined solely by the appended claims and is not affected to any degree by the statements within this summary.

In light of the above, there is a need for a method and system for protecting IoT-based devices and IoT-cloud platform from vulnerable IoT-based devices in the IoT environment.

The present embodiments may obviate one or more of the drawbacks or limitations in the related art. For example, a method and system for managing IOT-based devices in an IoT environment such that vulnerability from the IoT-based devices is prevented are provided.

A method of managing IoT-based devices in an IoT environment is provided. The method includes determining violation of at least one pre-defined security requirement by at least one IoT-based device. The method includes terminating communication with the IoT-based device when violation of at least one pre-defined security requirement by the at least one IoT-based device is determined. Further, the method includes generating a unique signature of the IoT-based device based on information associated with the IoT-based device. For example, the unique signature of the IoT-based device is generated using at least one of security certificate and authentication token assigned to the IoT-based device. Alternatively, the unique signature of the IoT-based device is generated using a unique identifier associated with the IoT-based device such as Medium Access Control (MAC) address and Internet Protocol address. The method may include sending a first notification indicating that the IoT-based device violates the at least one pre-defined security requirement to the IoT-based devices connected to the IoT-cloud platform. The first notification includes the unique signature of the IoT-based device. In one embodiment, the IoT-based devices may terminate ongoing communication with the vulnerable IoT-based device or reject a request from the vulnerable IoT-based device based on the first notification, thereby minimizing the security risk posed by the vulnerable IoT-based device. In one embodiment, the IoT environment is safeguarded against security risk posed by the vulnerable IoT-based device.

The method may include storing the unique signature of the IoT-based device in a vulnerable-device repository. In one embodiment, it may be determined whether a vulnerable IoT device is trying to establish communication with the IoT-cloud platform based on the unique signature of the vulnerable IoT-based device stored in the vulnerable-device repository.

The method may include determining a corrective action for resolving violation of the at least one pre-defined security requirement by the IoT-based device. The method may include performing the corrective action on the IoT-based device so that the IoT-based device meets the at least one pre-defined security requirement. In one embodiment, vulnerability associated with the IoT-based device is automatically fixed, thereby making the IoT-based device secure.

The method may include determining whether the IoT-based device complies with pre-defined security requirements. If the IoT-based device complies with the pre-defined security requirements, the method may include deleting the unique signature of the IoT-based device from the vulnerable-device database. The method may also include activating the suspended communication link between with the IoT-based device and the IoT-cloud platform. In one embodiment, the IoT-based device may communicate with the IoT-cloud platform.

Moreover, the method may include sending a second notification indicating that the IoT-based device complies with the pre-defined security requirements to the IoT-based devices in the IoT environment. In one embodiment, the IoT-based devices may establish communication with the IoT-based device based on the second communication.

The method may include determining whether the IoT-based device is a new device attempting to establish a communication link with the IoT-cloud platform. If the IoT-based device is the new device, the method may include blocking the IoT-based device from establishing the communication link with the IoT-cloud platform. If the IoT-based device is not the new device, the method may include temporarily suspending the communication link established between the IoT-based device and the IoT-cloud platform. The method may include storing the unique signature of the IoT-based device in a vulnerable-device database.

In one embodiment, a system including one or more processing units and an accessible memory unit coupled to the one or more processing units is provided. The memory unit includes a security module stored in the form of machine-readable instructions that, when executed by the one or more processing units, cause the one or more processing units to perform method acts mentioned above.

In one embodiment, an IoT-based device includes an IoT agent and a communication module. The IoT agent is configured to detect likelihood of violation of at least one pre-defined security requirement. The communication module is configured to report the likelihood of violation of the at least one pre-defined security requirement to an IoT-cloud platform. In one embodiment, vulnerabilities associated with the IoT-based device are automatically detected and reported to the IoT-cloud platform, thereby minimizing security risk posed by the vulnerable IoT-based device.

The communication module may be configured to receive a first notification indicating that an IoT-based device violates the at least one pre-defined security requirement. The first notification includes a unique signature of the IoT-based device.

The IoT-based device may include a vulnerable-device database configured to store the unique signature of the IoT-based device that violates the at least one predefined security requirement.

The IoT agent may be configured to terminate an active communication link with the IoT device or reject a request to establish a communication link based on the unique signature of the IoT-based device.

In one embodiment, an IoT-cloud environment includes an IoT-cloud platform configured to perform a method described above, and a plurality of IoT-based devices capable of connecting to the IoT-cloud platform and configured for performing acts described above.

The above-mentioned and other features of the present disclosure will now be addressed with reference to the accompanying drawings of the present disclosure. The illustrated embodiments are intended to illustrate, but not limit the invention.

BRIEF DESCRIPTION OF THE DRAWINGS

The present disclosure is further described hereinafter with reference to illustrated embodiments shown in the accompanying drawings, in which:

FIG. 7 is a schematic representation of an IoT environment, according to a second embodiment; and FIG. 8 is a flow diagram illustrating management of security risks in the IoT environment, according to the second embodiment.

DETAILED DESCRIPTION

Figure 1:
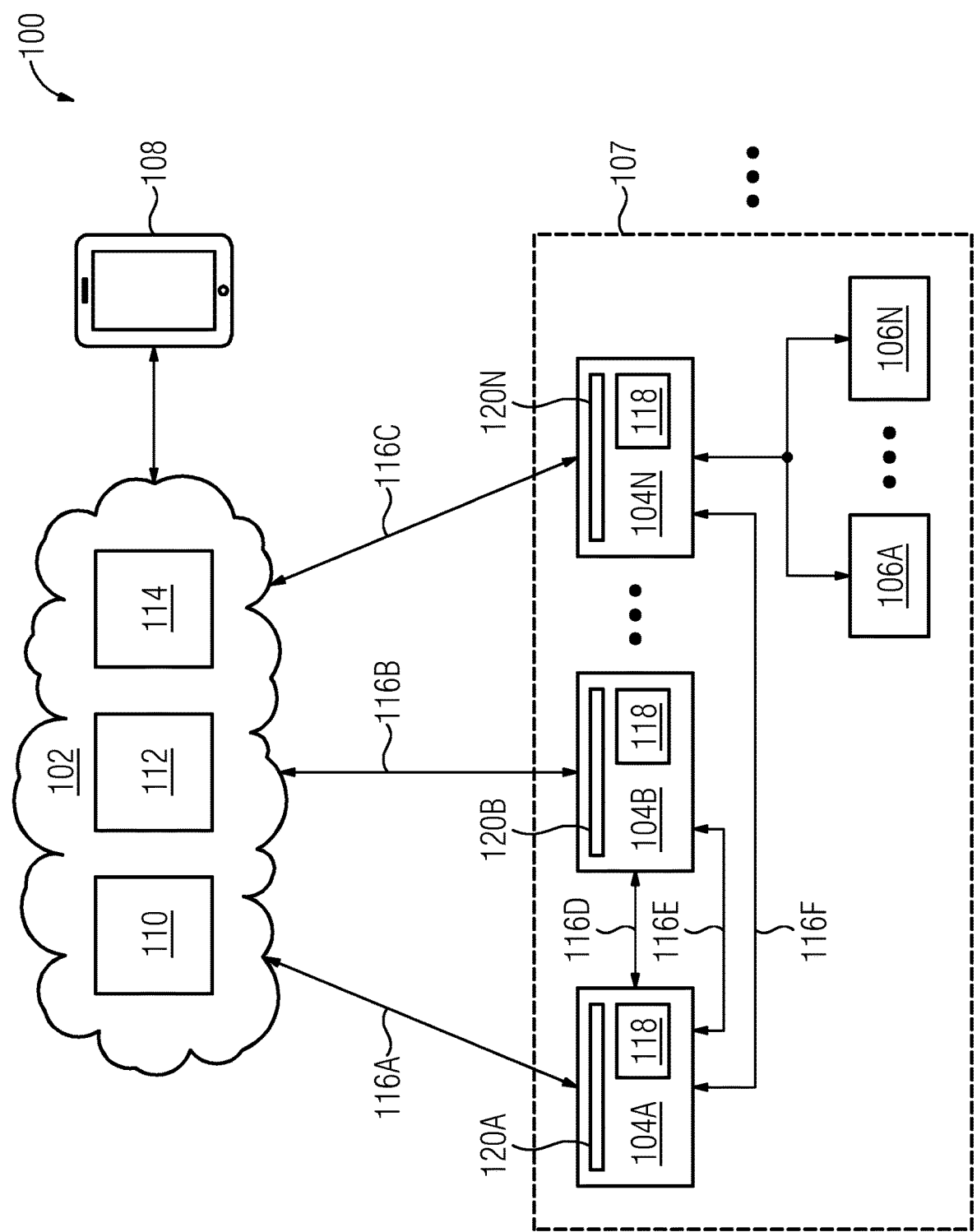
FIG. 1 is a schematic representation of an Internet-of-Things (IoT) environment, according to a first embodiment.

Various embodiments are described with reference to the drawings, where like reference numerals are used to refer to like elements throughout. In the following description, for the purpose of explanation, numerous specific details are set forth in order to provide thorough understanding of one or more embodiments. It may be evident that such embodiments may be practiced without these specific details.

FIG. 1 is a schematic representation of an Internet-of-Things (IoT) environment 100 according to a first embodiment. The IoT environment 100 includes an IoT-cloud platform 102, one or more plants 107 connected to the IoT-cloud platform 102, and a user device 108. The plants 107 may be an industrial setup such as a manufacturing facility, a power plant, etc. The plants 107 may be geographically distributed. Each of the plants 107 may include IoT-based devices 104A-N. The IoT-based devices 104A-N may be edge devices, IoT gateways, and/or different types of assets (e.g., equipment, machines, devices, sensors, actuators, etc.) located in the plant 107. Each of the IoT-based devices 104A-N is capable of communicating with the IoT-cloud platform 102 using respective communication interfaces 120A-N via communication links 116A-C via the Internet. Also, the IoT-based devices 104A-N are capable of communicating with each other using respective communication interfaces 120A-N via communication links 116D to 116F. The communication links 116D to 116F may be wired or wireless links.

Also, in the plant 107, the one or more IoT-based devices 104N may be connected, in the plant 107, to assets 106A-N that cannot directly communicate with the IoT-cloud platform 102. As shown in FIG. 1, the IoT-based device 104N is connected to assets 106A-N via wired or wireless network. For example, the IoT-based device 104N may be an IoT gateway, and the assets 106A-N may be robots, sensors, actuators, machines, robots, or other field devices that communicate to the IoT-cloud platform 102 via the IoT gateway.

Each of the IoT-based devices 104A-N is configured for communicating with the IoT-cloud platform 102 via the communication interfaces 120A-N. The IoT-based devices 104A-N may have an operating system and at least one software program for performing desired operations in the plant 107. Also, the IoT-based devices 104A-N may run software applications for collecting and pre-processing plant data (e.g., process data), and transmitting the pre-processed data to the IoT-cloud platform 102. The plant data is sensitive data and is to be handled in a secured manner. For this, the IoT environment 100 is to be secured and free from security attacks (e.g., hacker attacks, malware attacks, etc.). The IoT-based devices 104A-N are to comply with pre-defined security requirements (e.g., security policies, security rules, etc.) to keep the IoT environment 100 free from cyber attacks and other security risks. For example, the IoT-based devices 104A-N may have up-to-date security algorithms and certificates (e.g., anti-virus software, anti-malware software, security certificates, software patches, etc.).

The IoT-cloud platform 102 may be a cloud infrastructure capable of providing cloud-based services such data storage services, data analytics services, data visualization services, etc. based on the plant data. The IoT-cloud platform 102 may be part of public cloud or a private cloud. The IoT-cloud platform 102 may enable data scientists/software vendors to provide software applications/firmware as a service, thereby eliminating a need for software maintenance, upgrading, and backup by the users. The software application may be a full application or a software patch. In some embodiments, the software application may be an analytical application for performing data analytics on the IoT-based devices 104A-N. For example, the software application may include an application for down-sampling of time series data, filtering time series data based on thresholds or moving averages, performing Fast-Fourier transform on vibration data and filtering frequencies that indicate anomaly, performing liner regression and trend prediction, local classification using support vector machine classifiers, neural network or deep learning classifiers, performing stream analytics, etc. For example, the firmware may include PLC firmware, HMI screens, firmware for motor drives, CNC machines, robots, etc.

Figure 2:
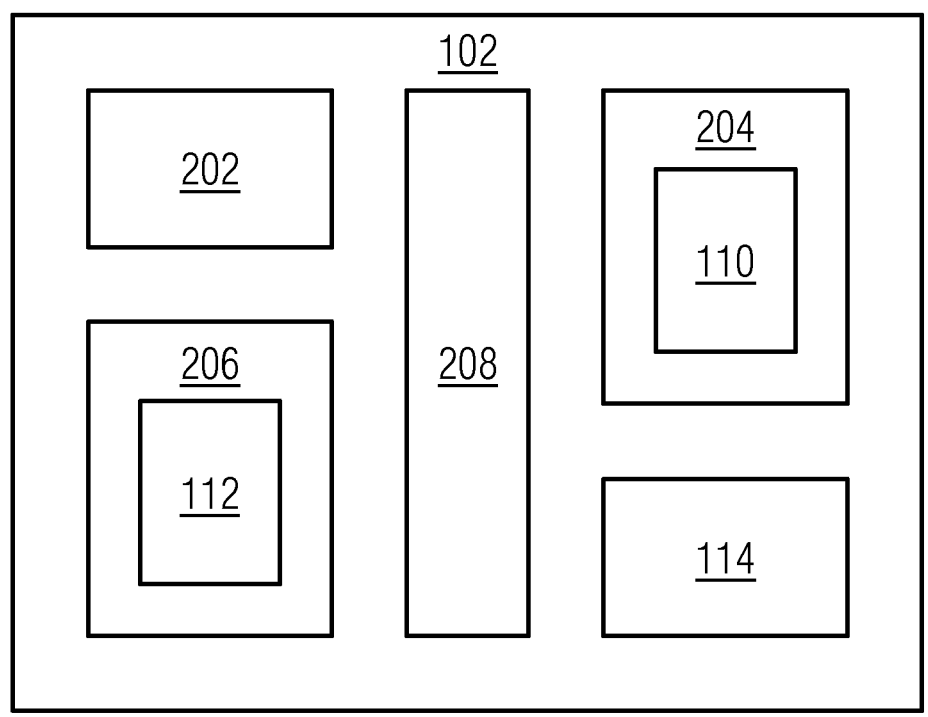
FIG. 2 is a block diagram of an IoT-cloud platform as shown in FIG. 1, according to the first embodiment.

The IoT-cloud platform 102 is further illustrated in greater detail in FIG. 2. Referring to FIG. 2, the IoT-cloud platform 102 includes processors 202, a memory unit 204, a storage unit 206, a communication module 114, and an interface 208. The memory unit 204 includes a security module 110 stored in the form of machine-readable instructions and executable by the processor(s) 202. Alternatively, the security module 110 may take a form of hardware such as a processor with embedded software.

The processor(s) 202 may be one or more processing units (e.g., servers) capable of processing requests from the IoT-based devices 104A-N and the user device 108. The processor(s) 202 is also capable of executing machine-readable instructions stored on a computer-readable storage medium such as the memory unit 204 for performing various functions such as processing plant data, analyzing plant data, providing visualization of the analyzed plant data, issuing control commands, managing the IoT-based devices 104A-N (e.g., authentication, communication, upgradation) and so on.

The storage unit 206 may be volatile or non-volatile storage. In one embodiment, the storage unit 206 is configured to store a vulnerable-device database 112. The vulnerable-device database 110 may store a list of IoT-based devices that are vulnerable and may pose security risk to the IoT environment 100. The vulnerable-device database 110 may also store pre-defined security requirements to be fulfilled by the IoT-based devices 104A-N for establishing with communication with each other and the IoT-cloud platform 102. The storage unit 206 may also store, for example, an application repository for storing software and firmware, a data store for storing asset models and IoT data models, and a visualization database for storing visualization templates.

The communication module 114 is configured to establish and maintain communication links with the IoT devices 104A-N. Also, the communication module 114 is configured to maintain a communication channel between the IoT-cloud platform 102 and the user device 108. The interface 208 acts as interconnect between different components of the IoT-cloud platform 102.

The IoT-cloud platform 102 is configured for managing IoT-based devices 104A-N. For example, the IoT-cloud platform 102 may identify vulnerable IoT-based device(s) (e.g., the IoT-based device 104A) in the IoT-environment 100 and blacklist the IoT-based device(s) 104A. In an exemplary operation, the security module 110 is configured to determine whether any of the IoT-based devices 104A-N violates pre-defined security requirements to be satisfied for secured network communication in the IoT environment 100. For example, the security module 110 may include a network scanning module with network packet inspection and heuristic scanning algorithms to determine IoT-based devices 104A-N that may violate the pre-defined security requirements (e.g., which can pose security risks in the IoT environment 100). The IoT-based device that violates the pre-defined security requirements are also interchangeably referred to as 'vulnerable IoT-based device' throughout the description.

If one or more IoT-based devices 104A are found as violating the pre-defined security requirements, the security module 110 generates and stores a unique signature of a vulnerable IoT-based device 104A in the vulnerable-device database 112. In one embodiment, the unique signature may be generated using an authentication token or a security certificate assigned to the respective IoT-based device 104A. In another embodiment, the unique signature may be generated using Medium Access Control (MAC) address and/or Internet Protocol (IP) address of the respective IoT-based device 104A. The security module 110 blocks the vulnerable IoT-based device 104A from further communication with the IoT-cloud platform 102. In other words, the vulnerable IoT-based devices are not allowed to exchange messages, data, requests, etc. with the IoT-cloud platform 102. Also, the existing network communication with the IoT-based device 104A is terminated, and new requests from the IoT-based device 104A for establishing the communication link are rejected or temporarily suspended until a corrective action is taken to fix the violation.

The security module 110 determines one or more non-vulnerable IoT-based devices 104B-N that act as communication partners to the vulnerable IoT-based device 104A in the IoT environment 100. The non-vulnerable IoT-based devices acting as communication partner may be a part of a same subnet or located within a same plant 107 as the IoT-based device 104A. The communication module 114 sends a first notification informing about the vulnerable IoT-device 104A to the determined non-vulnerable IoT-based devices 104B-N. The non-vulnerable IoT-based devices 104B-N may store the unique signature of the vulnerable IoT-based device 104A in the respective vulnerable-device database 118. Additionally, the non-vulnerable IoT-based devices 104B-N blocks the vulnerable IoT-based device 104A from further inter-device communication. In other words, the non-vulnerable IoT-based devices 104B-N terminate existing inter-device communication with the vulnerable IoT-based device 104A and reject future communication requests from the IoT-based device 104A.

Additionally, the security module 110 determines a corrective action for resolving violation of the pre-defined security requirements by the vulnerable IoT-based device 104A. In one embodiment, the security module 110 performs the corrective action on the vulnerable IoT-based device 104A over a secure connection. The secure connection is a temporary secure connection established with the IoT-based device 104A by the IoT-cloud platform 102 for performing the corrective action. Upon performing the corrective action, the vulnerable IoT-based device 104A may comply with the pre-defined security requirements. In another embodiment, the security module 110 may display the pre-defined security requirement violated by the vulnerable IoT-based device 104A and the corrective action proposed by the IoT-cloud platform 102 on the user device 108 of a field engineer. Also, the security module 110 may display an augmented-reality view of performing the corrective action at the vulnerable IoT-based device 104A. Accordingly, the field engineer may perform the corrective action proposed by the IoT-cloud platform 102 and/or other actions to make the vulnerable IoT-based device 104A comply with the pre-defined security requirements. The field engineer may perform the actions by visiting the location of the vulnerable IoT-based device 104A or from a remote location over a secure connection between the user device 108 and the vulnerable IoT-based device 104A.

The security module 110 automatically removes the unique signature of the vulnerable IoT-based device 104A from the vulnerable-device database 112. Alternatively, a system administrator of the IoT-cloud platform 102 deletes the unique signature of the vulnerable IoT-based device 104A from the vulnerable-device database 112. Then, the communication module 114 activates the communication link with the IoT-based device 104A or establishes a new communication link with the IoT-based device 104A. Also, the security module 110 sends a second notification with the unique signature of the vulnerable IoT-based device 104A to the non-vulnerable IoT-based devices 104B-N. The second notification indicates that the IoT-based device 104A has become non-vulnerable as the IoT-based device 104A complies with the pre-defined security requirements. Accordingly, the non-vulnerable IoT-based devices 104A-N delete the unique signature from the respective vulnerable-device database 118 and establish a communication link with the IoT-based device 104A.

Figure 3:
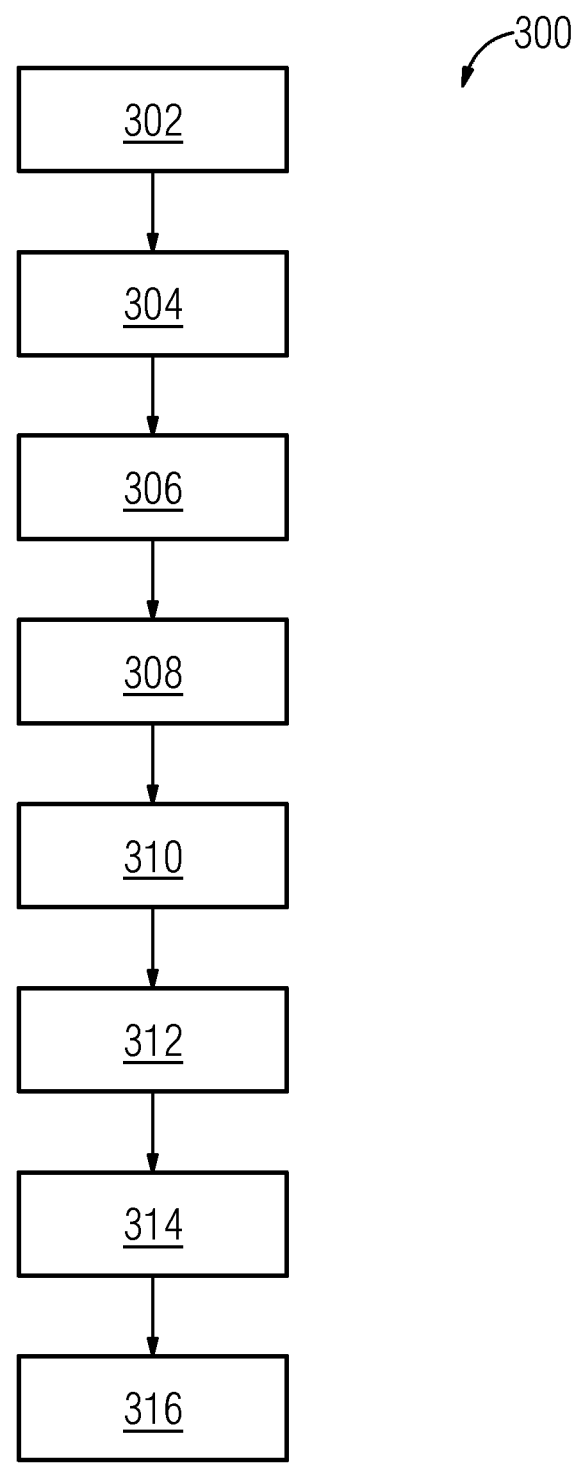
FIG. 3 is a process flowchart illustrating an exemplary method of managing IoT-based devices in the IoT environment, according the first embodiment.

FIG. 3 is a process flowchart 300 illustrating an exemplary method of managing IoT-based devices 104A-N in the IoT environment 100, according to the first embodiment. At act 302, violation of at least one pre-defined security requirement by an IoT-based device (e.g., the IoT-based device 104A) is determined. At act 304, a unique signature of the IoT-based device is generated based on the information associated with the IoT based device 104A.

At act 306, communication between the IoT-based device 104A and the IoT-cloud platform 102 is terminated. At act 308, a first notification indicating that the IoT-based device 104A violates the pre-defined security requirement is sent to the IoT devices 104B-N. In some embodiments, one or more IoT-based devices 104B-N that are possible communication partners with the IoT-based device 104A are determined. For example, the IoT-based devices that are in a same subnet or located in a same plant 107 are determined as possible communication partners to the IoT-based device 104A. In these embodiments, the first notification is sent to the determined IoT-based devices 104B-N. Accordingly, the IoT-based devices 104B-N terminate ongoing communication with the IoT-based device 104A or block any new request for establishing communication from the IoT-based device 104A based on the first notification. Risk of security attack on the IoT-based devices 104B-N from the IoT-based device 104A is prevented or minimized.

At act 310, a corrective action for resolving violation of the at least one pre-defined security requirement by the IoT-based device 104A is determined. At act 312, the corrective action on the IoT-based device 104A is performed. The corrective action provides that the IoT-based device 104A meets the pre-defined security requirements.

At act 314, the suspended communication link is activated or a new communication link is established with the IoT device 104A. At act 316, a second notification indicating that the IoT-based device 104A complies with pre-defined security requirements is sent to the IoT-based devices 104B-N in the IoT environment 100. Accordingly, the IoT devices 104B-N may continue to communicate with the IoT device 104A as the IoT-based device 104A is determined as not vulnerable.

Figure 4:
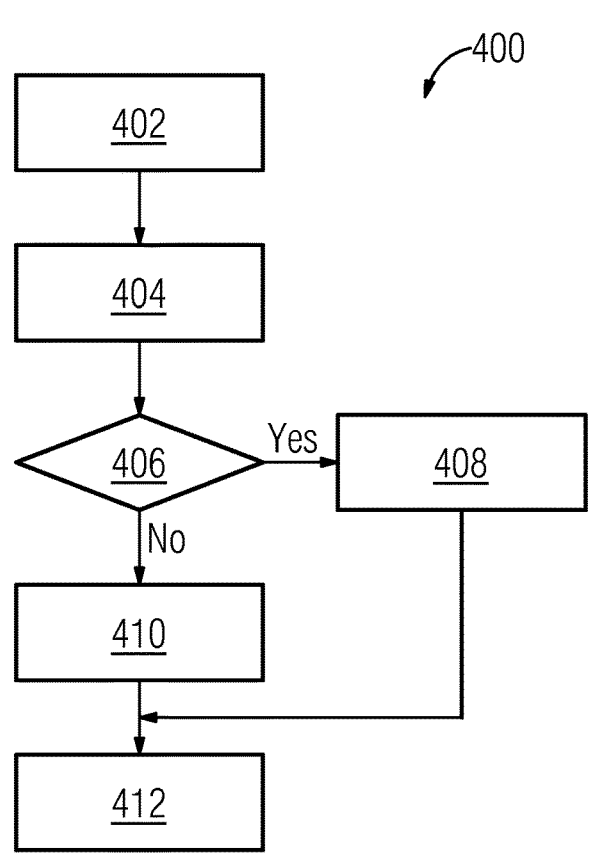
FIG. 4 is a process flowchart illustrating a detailed method of managing security risk from the IoT-based devices, according to the first embodiment.

FIG. 4 is a process flowchart 400 illustrating a detailed method of managing security risk from any of the IoT-based devices 104A-N, according to the first embodiment. At act 402, violation of one or more pre-defined security requirements by an IoT-based device 104A is determined. At act 404, a unique signature of the IoT-based device 104A is generated based on information associated with the IoT-based device 104A.

At act 406, it is determined whether the IoT-based device 104A is a new device attempting to establish a communication link with the IoT-cloud platform 102. If the IoT-based device 104A is the new device, then at act 408, the IoT-based device 104A is blocked from establishing the communication link with the IoT-cloud platform 102. If the IoT-based device 104A is not a new device, then at act 410, the communication link established between the IoT-based device 104A and the IoT-cloud platform 102 is temporarily suspended. At act 412, a notification indicating that the IoT-based device 104A does not meet pre-defined security requirements is sent to the IoT-based devices 104B-N connected to the IoT-cloud platform 102. Accordingly, the IoT-based devices 104B-N may terminate the communication link with the IoT-based device 104A. Also, the IoT-based devices 104B-N may store the unique signature of the IoT-based device 104A in the vulnerable-device database 118.

Figure 5:
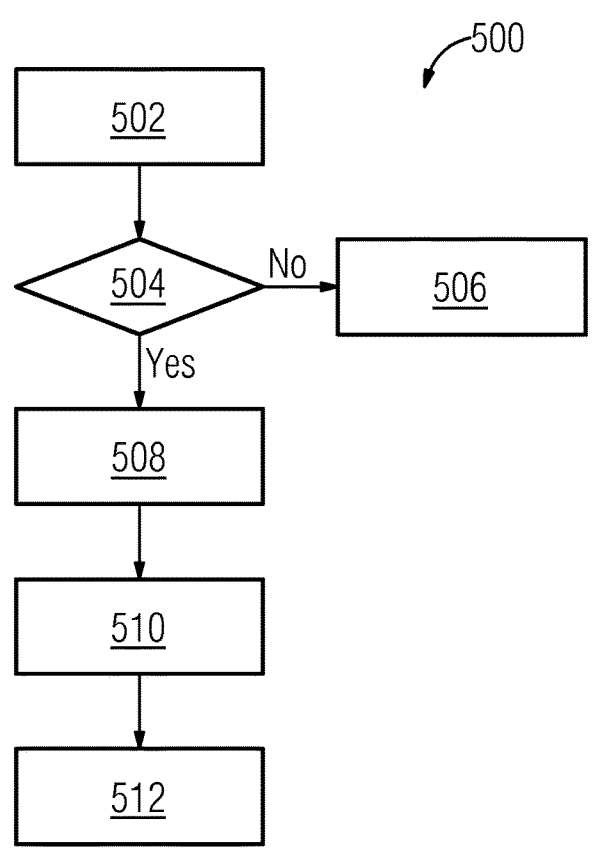
FIG. 5 is a process flowchart illustrating a detailed method of performing a corrective action on an IoT-based device that violates pre-defined security requirements, according to the first embodiment.

FIG. 5 is a process flowchart 500 illustrating a detailed method of performing a corrective action on the IoT-based device 104A that violates pre-defined security requirements, according to the first embodiment. At act 502, a corrective action is performed on the IoT-based device 104A to resolve a security breach by the IoT device 104A. In some embodiments, a secure connection is established with the IoT-based device 104A by the IoT-cloud platform 102. In these embodiments, the corrective actions, such as performing firmware updates, installing software patches, removing malicious/infected files etc., are performed on the IoT-based device 104A. At act 504, it is determined whether IoT-based device 104A complies with pre-defined security requirements.

If the IoT-based device 104A still does not comply with the pre-defined security requirements, then at act 506, the process 500 is terminated. Additionally, a notification is sent to a system administrator to address the security breach by the IoT-based device 104A. If the IoT-based device 104A complies with the pre-defined security requirements, then at act 508, the unique signature of the IoT-based device 104A is deleted from the vulnerable-device database 112. At act 510, the suspended communication link between the IoT-based device 104A and the IoT-cloud platform 102 is activated. Similarly, if the IoT-based device 104A is a new device, then the IoT-cloud platform 102 establishes a communication link with the IoT-based device 104A. At act 512, a second notification indicating that the IoT-based device 104A complies with the pre-defined security requirements is sent to the associated IoT-based devices 104B-N in the IoT environment 100. The IoT-based devices 104B-N may then resume the communication with the IoT-based device 104A, as the IoT-based device 104A is no longer vulnerable. Accordingly, the IoT-based devices 104B-N remove the unique signature of the IoT-based device 104A from the respective vulnerable-device database 118.

Figure 6:
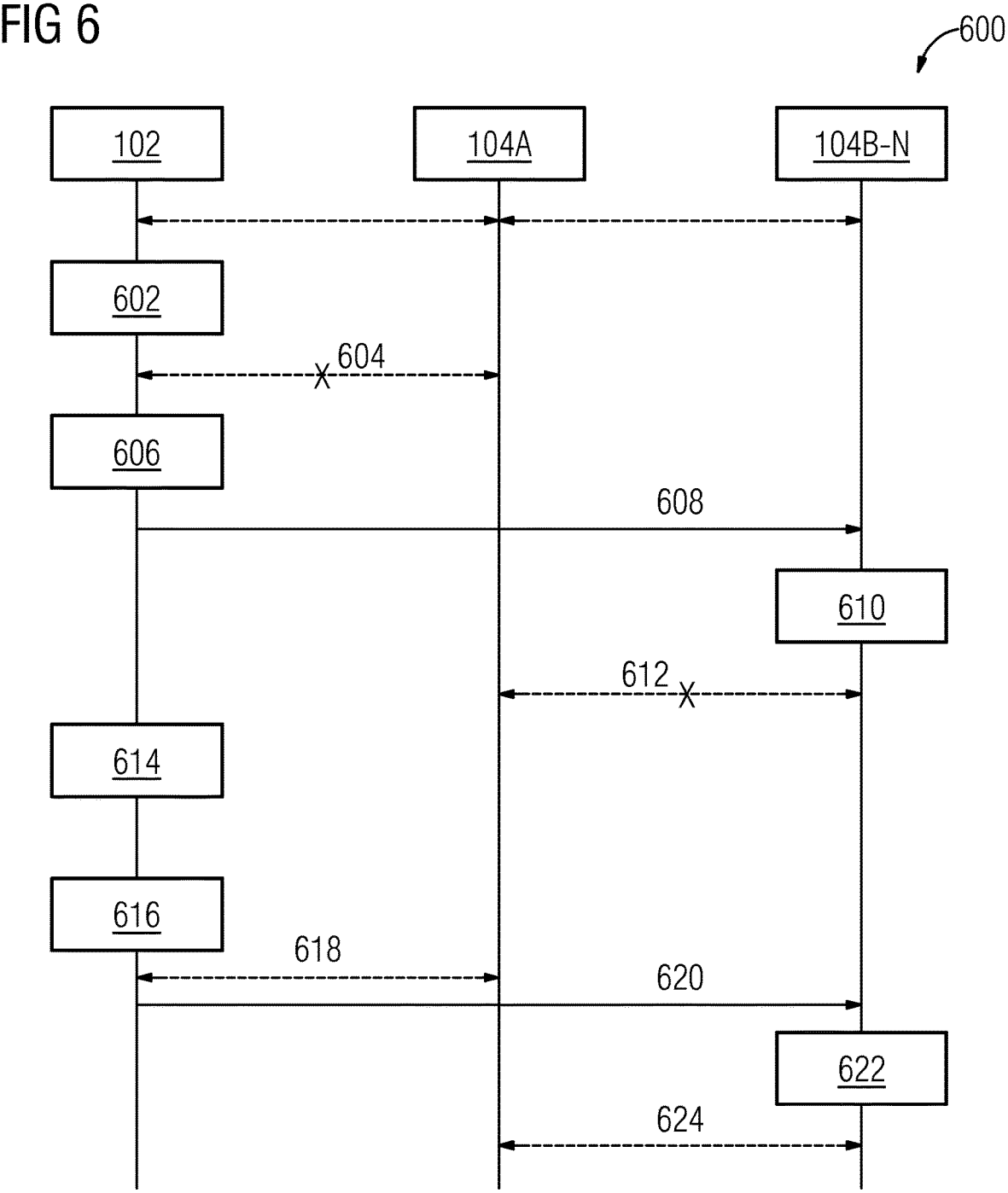
FIG. 6 is a flow diagram illustrating management of security risks in the IoT environment, according to the first embodiment.

FIG. 6 is a flow diagram 600 illustrating management of security risks in the IoT environment 100, according to the first embodiment. An IoT-based device 104A is trying to establish a communication link with the IoT-cloud platform 102. The IoT-based device 104A is trying to establish communication link with other IoT-based devices 104B-N. In such a scenario, the IoT-cloud platform 102 determines whether the IoT-based device 104A complies with pre-defined security requirements necessary to keep the IoT environment 100 free from vulnerability.

At act 602, the IoT-cloud platform 102 determines that the IoT-based device 104A violates one or more pre-defined security requirements. At act 604, the IoT-based device 104A terminates a communication link with the IoT-based device 104A. At act 606, the IoT-cloud platform 102 generates and stores a unique signature of the IoT-based device 104A in the vulnerable-device database 112. For example, the unique signature may be generated based on MAC address and/or an IP address of the IoT-based device 104A. At act 608, the IoT-cloud platform 102 sends a first notification with the unique signature to the IoT-based devices 104B-N. The first notification indicates that the IoT-based device 104A violates the pre-defined security requirements, and is thus vulnerable.

At act 610, the IoT-based devices 104B-N stores the unique signature of the IoT-based device 104A in respective vulnerable-device database 118. In an exemplary implementation, the unique signature is added to a list of IoT-based devices that are considered as vulnerable. At act 612, the IoT-based devices 104B-N terminates an existing communication link with the IoT-based device 104A based on the first notification.

The IoT-cloud platform 102 analyzes reasons responsible for violation of the pre-defined security requirements and computes one or more corrective actions that are to be performed. In some instances, at act 614, the IoT-cloud platform 102 automatically performs the one or more corrective actions (e.g., firmware upgrade, bug fixes, etc.) on the IoT-based device 104A to address the vulnerability issue. In other instances, the IoT-cloud platform 102 enables a field engineer to perform the corrective actions on the IoT-based device 104A such that the IoT-based device 104A complies with the pre-defined security requirements. This may be achieved through the user device 108 that may be augmented reality device, virtual reality device, tablet computer, and so on.

Once the above act is successful, at act 616, the IoT-cloud platform 102 removes the unique signature of the IoT-based device 104A from the vulnerable-device database 112. At act 618, the IoT-cloud platform 102 activates the communication link with the IoT-based device 104A. At act 620, the IoT-cloud platform 102 sends a second notification with the unique signature of the IoT-based device 104A to the IoT-based devices 104B-N. The second notification indicates that the IoT-based device 104A complies with the pre-defined security requirements. Accordingly, at act 622, the IoT-based devices 104B-N remove the unique signature of the IoT-based device 104A from the respective vulnerable-device database 118. At act 624, the IoT-based devices 104B-N may re-establish a communication link with the IoT-based device 104A, as the IoT-based device 104A is no more vulnerable to the IoT environment 100.

FIG. 7 is a schematic representation of an Internet-of-Things (IoT) environment 700, according to a second embodiment. The IoT environment 700 is similar to the IoT environment 100 of FIG. 1, except that the IoT-based devices 104A-N in the IoT environment 700 include IoT agents 702A-N. The IoT agents 702A-N may be software or hardware capable of detecting a potential security risk in a respective IoT-based device or connected IoT-based devices. In one embodiment, the IoT agents 702A-N determine whether the respective IoT-based devices 104A-N violate pre-defined security requirements and report such violation to the IoT-cloud platform 102. The IoT agents 702A-N may use rules and heuristics to determine security breach by the respective IoT-based devices 104A-N. For example, each of the IoT agents 702A-N may periodically run anti-malware software on the respective IoT-based devices 104A-N. The IoT agents 702A-N may query the anti-malware software to determine whether the respective IoT-based devices 104A-N are infected from malware. In case any of the IoT-based devices 104A-N is found to be infected, the respective IoT agents 702A-N report the malware attack to the IoT-cloud platform 102. Also, the IoT agents 702A-N query patch levels and version of the firmware/software deployed on the respective IoT devices 104A-N and determine whether the patch levels and version of the firmware/software is not up-to-date. In an example, if the version of SSL library installed on the IoT-based devices 104A-N is not up-to-date, the respective IoT agent 702A-N may consider that the outdated SSL library violates pre-defined security requirements.

In another embodiment, the IoT agents 702A-N determine whether connected IoT-based devices 104A-N violate at least one pre-defined security requirement and report such violation to the IoT-cloud platform 102. The method of managing security aspects in the IoT environment 700 using the IoT agents 702A-N is described in greater detail in FIG. 8.

FIG. 8 is a flow diagram 800 illustrating management of security risks in the IoT environment, according to the second embodiment. The IoT-based device 104A determines whether the IoT-based device 104A complies with pre-defined security requirements. At act 802, the IoT-based device 104A determines that the IoT-based device 104A violates one or more pre-defined security requirements. At act 804, the IoT-based device 104A notifies the IoT-cloud platform 102 that the IoT-based device 104A does not comply with the pre-defined security requirements. At act 806, the IoT-cloud platform 102 determines whether the IoT-based device 104A violates at least one pre-defined security environment. At act 808, the IoT-cloud platform 102 terminates a communication link with the IoT-based device 104A.

At act 810, the IoT-cloud platform 102 generates and stores a unique signature of the IoT-based device 104A in the vulnerable-device database 112. At act 812, the IoT-cloud platform 102 sends a first notification with the unique signature to the IoT-based devices 104B-N. The first notification indicates that the IoT-based device 104A violates the pre-defined security requirements, and is thus vulnerable.

At act 814, the IoT-based devices 104B-N store the unique signature of the IoT-based device 104A in a respective vulnerable-device database 118. In an exemplary implementation, the unique signature is added to a list of IoT-based devices that are considered as vulnerable. At act 816, the IoT-based devices 104B-N terminate existing communication links with the IoT-based device 104A based on the first notification.

The IoT-cloud platform 102 analyzes reasons responsible for violation of the pre-defined security requirements and computes one or more corrective actions to be performed. In some instances, at act 818, the IoT-cloud platform 102 performs the corrective action on the IoT-based device 104A to fix the security breach. In other instances, the IoT-cloud platform 102 enables a field engineer to perform the corrective action on the IoT-based device 104A such that the IoT-based device 104A complies with the pre-defined security requirements. This may be achieved through the user device 108 that may be an augmented reality device, a virtual reality device, a tablet computer, and so on.

Once the above act is successful, at act 820, the IoT-cloud platform 102 removes the unique signature of the IoT-based device 104A from the vulnerable-device database 112. At act 822, the IoT-cloud platform 102 activates the communication link with the IoT-based device 104A. At act 824, the IoT-cloud platform 102 sends a second notification with the unique signature of the IoT-based device 104A to the IoT-based devices 104B-N. The second notification indicates that the IoT-based device 104A complies with the pre-defined security requirements. Accordingly, at act 826, the IoT-based devices 104B-N remove the unique signature of the IoT-based device 104A from the respective vulnerable-device database 118. At act 828, the IoT-based devices 104B-N may re-establish a communication link with the IoT-based device 104A, as the IoT-based device 104A is not vulnerable.

The present disclosure may take the form of a computer program product including program modules accessible from computer-usable or computer-readable medium and storing program code for use by or in connection with one or more computers, processors, or instruction execution systems. For the purpose of this description, a computer-usable or computer-readable medium may be any apparatus that may contain, store, communicate, propagate, or transport the program for use by or in connection with the instruction execution system, apparatus, or device. The medium may be an electronic, magnetic, optical, electro-magnetic, infrared, or semiconductor system (or apparatus or device), or propagation mediums in and of themselves, as signal carriers are not included in the definition of physical computer-readable medium. The physical computer-readable medium may include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, or a DVD. Both processors and program code for implementing each aspect of the technology may be centralized or distributed (or a combination thereof) as known to those skilled in the art.

While the present disclosure has been described in detail with reference to certain embodiments, the present disclosure is not limited to those embodiments. In view of the present disclosure, many modifications and variations would be present themselves to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also apply to system/apparatus claims.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of managing IoT-based devices in an Internet-of-Things environment including an IoT-cloud platform and a plurality of IoT-based devices connectable to the IoT-cloud platform, the method comprising:
   determining, by the IoT-cloud platform, violation of at least one pre-defined security requirement by at least one vulnerable IoT-based device;
   terminating, by the IoT-cloud platform, communication with a vulnerable IoT-based device of the at least one vulnerable IoT-based device when violation of the at least one pre-defined security requirement by the at least one vulnerable IoT-based device is determined;
   generating, by the IoT-cloud platform, a unique signature of the vulnerable IoT-based device based on information associated with the vulnerable IoT-based device; and
   sending, by the IoT-cloud platform, a first notification indicating that the vulnerable IoT-based device violates the at least one pre-defined security requirement to one or more other non-vulnerable IoT-based devices connected to the IoT-cloud platform, wherein the first notification comprises the unique signature of the vulnerable IoT-based device,
   wherein the one or more other non-vulnerable IoT-based devices terminate communication with the vulnerable IoT-based device based on the unique signature of the vulnerable IoT-based device in the first notification.

2. The method of claim 1, further comprising:
   storing, by the IoT-cloud platform, the unique signature of the vulnerable IoT-based device in a vulnerable-device database.

3. The method of claim 1, further comprising:
   determining, by the IoT-cloud platform, a corrective action for resolving violation of the at least one pre-defined security requirement by the vulnerable IoT-based device.

4. The method of claim 3, further comprising:
   performing, by the IoT-cloud platform, the corrective action on the vulnerable IoT-based device so that the vulnerable IoT-based device meets the at least one pre-defined security requirement.

5. The method of claim 1, further comprising:
   determining, by the IoT-cloud platform, whether the vulnerable IoT-based device complies with the at least one pre-defined security requirement;
   when the vulnerable IoT-based device complies with the at least one pre-defined security requirement indicating that the vulnerable IoT-based device becomes a non-vulnerable IoT based device, deleting, by the IoT-cloud platform, the unique signature of the vulnerable IoT-based device from the vulnerable-device database;

activating, by the IoT-cloud platform, the suspended communication link between the now non-vulnerable IoT-based device and the IoT-cloud platform; and sending, by the IoT-cloud platform, a second notification indicating that the now non-vulnerable IoT-based device complies with the at least one pre-defined security requirement to the other non-vulnerable IoT-based devices in the Internet-of-Things environment.

6. The method of claim 1, wherein generating the unique signature of the vulnerable IoT-based device comprises generating, by the IoT-cloud platform, the unique signature of the vulnerable IoT-based device using a security certificate, an authentication token, or the security certificate and the authentication token assigned to the vulnerable IoT-based device.

7. The method of claim 1, wherein generating the unique signature of the vulnerable IoT-based device comprises generating, by the IoT-cloud platform, the unique signature of the vulnerable IoT-based device using a unique identifier associated with the vulnerable IoT-based device, and wherein the unique identifier is selected from the group consisting of Medium Access Control (MAC) address and Internet Protocol address.

8. The method of claim 1, wherein terminating the communication with the vulnerable IoT-based device comprises:

determining, by the IoT-cloud platform, whether the vulnerable IoT-based device is a new device attempting to establish a communication link with the IoT-cloud platform;

when the vulnerable IoT-based device is the new device, blocking, by the IoT-cloud platform, the vulnerable IoT-based device from establishing the communication link with the IoT-cloud platform; and when the vulnerable IoT-based device is not the new device, temporarily suspending, by the IoT-cloud platform, the communication link established between the vulnerable IoT-based device and the IoT-cloud platform.

9. A system comprising:
one or more processors; and
an accessible memory unit coupled to the one or more processors,
wherein the accessible memory unit comprises a security module stored in the form of machine-readable instructions executable by the one or more processors to manage IoT-based devices in an Internet-of-Things environment including an IoT-cloud platform and a plurality of IoT-based devices connectable to the IoT-cloud platform, the machine-readable instructions comprising:
determining, by the IoT-cloud platform, violation of at least one pre-defined security requirement by at least one vulnerable IoT-based device;

terminating, by the IoT-cloud platform, communication with a vulnerable IoT-based device of the at least one vulnerable IoT-based device when violation of the at least one pre-defined security requirement by the at least one vulnerable IoT-based device is determined;

generating, by the IoT-cloud platform, a unique signature of the vulnerable IoT-based device based on information associated with the vulnerable IoT-based device; and sending, by the IoT-cloud platform, a first notification indicating that the vulnerable IoT-based device violates the at least one pre-defined security requirement to one or more non-vulnerable IoT-based devices connected to the IoT-cloud platform, wherein the first notification comprises the unique signature of the vulnerable IoT-based device, wherein one or more other non-vulnerable IoT-based devices terminate communication with the vulnerable IoT-based device based on the unique signature of the vulnerable IoT-based device in the first notification.

10. A system comprising:
an IoT-cloud platform, to which a plurality of IoT-based devices are connectable, the plurality of IoT-based devices comprises a first IoT-based device and at least one vulnerable second IoT-based device, the first IoT-based device comprising:
an IoT agent; and
a communication module, wherein the IoT agent is configured to detect likelihood of violation of at least one pre-defined security requirement by the first IoT-based device, wherein the communication module is configured to report the likelihood of violation of the at least one pre-defined security requirement to the IoT-cloud platform, wherein the communication module is configured to receive a first notification from the IoT-cloud platform, the first notification indicating that the vulnerable second IoT-based device violates the at least one pre-defined security requirement, and wherein the first notification includes a unique signature of the vulnerable second IoT-based device; and
a vulnerable-device database configured to store the unique signature of the vulnerable second IoT-based device, which violates the at least one pre-defined security requirement,
wherein the IoT agent is configured to terminate an active communication link with the vulnerable second IoT-based device or reject a request to establish a communication link with the vulnerable second IoT-based device based on the unique signature of the vulnerable second IoT-based device.

* * * * *